United States Patent [19]
Takeuchi

[11] Patent Number: 5,418,622
[45] Date of Patent: May 23, 1995

[54] APPARATUS FOR RECORDING AND REPRODUCING AUDIO AND VIDEO SIGNALS IN ACCORDANCE WITH A BROADCAST SCHEDULE

[75] Inventor: Hajime Takeuchi, Kanagawa, Japan

[73] Assignee: Sony Corporation, Tokyo, Japan

[21] Appl. No.: 141,612

[22] Filed: Oct. 27, 1993

[30] Foreign Application Priority Data

Oct. 27, 1992 [JP] Japan .................. 4-289075

[51] Int. Cl.⁶ .................. H04N 5/76; H04N 5/222
[52] U.S. Cl. .................. 358/335; 348/9; 348/722; 360/33.1; 358/341; 358/343
[58] Field of Search .................. 358/335, 310, 342; 360/13, 35.1, 14.1, 14.2, 14.3, 33.1; 348/6, 7, 9, 722; 455/3.1, 6.3; H04N 5/76, 5/781, 5/782, 5/783, 5/78, 5/92, 9/79, 5/222

[56] References Cited

U.S. PATENT DOCUMENTS

| | | | |
|---|---|---|---|
| 4,750,050 | 6/1988 | Belmares-Serabia et al. | 358/311 |
| 4,849,817 | 7/1989 | Short | 358/311 |
| 4,979,057 | 12/1990 | Matsumoto et al. | |
| 5,080,945 | 1/1992 | Moriwaki et al. | 369/275.1 |
| 5,197,047 | 3/1993 | Witheridge et al. | 358/335 |
| 5,218,672 | 6/1993 | Morgan et al. | 358/342 |
| 5,274,463 | 12/1993 | Matsumoto et al. | 358/342 |
| 5,299,255 | 3/1994 | Iwaki et al. | 358/402 |

FOREIGN PATENT DOCUMENTS

0394939 10/1990 European Pat. Off. .
0482802 4/1992 European Pat. Off. .
0493098 7/1992 European Pat. Off. .

*Primary Examiner*—Tommy P. Chin
*Assistant Examiner*—Thai Tran
*Attorney, Agent, or Firm*—William S. Frommer; Alvin Sinderbrand

[57] ABSTRACT

A recording and reproducing system has two controllers. One of the controllers compares broadcast schedule list data with the data bases of a plurality of recorder/reproducers to detect which recorder/reproducers have not recorded which material, controls a cart machine to reproduce the video and audio signals of the detected material, and controls the detected recorder/reproducers to record the reproduced video and audio signals. The other controller places the recorder/reproducers in a playback mode based on broadcast control data, and controls them to reproduce and transmit the video and audio signals of materials at corresponding broadcasting times. The recording and reproducing system can automatically carry out a preparatory process to reproduce the same material in a plurality of transmission channels, can easily change the order in which materials are scheduled to be transmitted immediately before they are broadcast, and is relatively inexpensive to manufacture. The recording and reproducing system operates highly efficiently because any missing materials can be recorded while a program material or a live broadcast is being transmitted.

11 Claims, 4 Drawing Sheets

| No. | Starting Time (H,M,S) | ID Number | Title | Continuation Time (M,S) | Shelf Number | Ch |
|---|---|---|---|---|---|---|
| 1 | 12:30:00 | C31 | Television | 00:30 | 100 | A |
| 2 | | C34 | Cassette Deck | 00:30 | 101 | A |
| 3 | | I33 | Program | 01:00 | 102 | A |
| 4 | 12:37:00 | C11 | VTR | 00:30 | A04 | A |
| 5 | | C37 | Mini-Disk | 01:30 | E1 | A |
| 6 | | C44 | CD Player | 00:30 | 121 | A |
| 7 | 14:00:00 | C21 | Karaoke | 01:30 | 131 | A |

F1　F2　F3　F4　F5　F6　F7　F8

APPARATUS FOR RECORDING AND REPRODUCING AUDIO AND VIDEO SIGNALS IN ACCORDANCE WITH A BROADCAST SCHEDULE

BACKGROUND OF THE INVENTION

1. Field of the Invention

The present invention relates to a recording and reproducing system suitable for use as, for example, a system for recording and reproducing information in a plurality of channels.

2. Description of the Prior Art

Two methods are available for broadcast stations that have a plurality of transmission channels to reproduce materials of relatively short broadcast times, such as commercials, among the various programs that are broadcast in the transmission channels.

According to one method, materials such as commercials are recorded on respective tapes such as video tape cassettes in the order in which they are to be transmitted for broadcast in the channels, producing prerecorded video tape cassettes, and thereafter the materials recorded on the video tape cassettes are reproduced by video tape recorders (VTRs) corresponding to the respective channels.

The other method employs as many systems called multicassette systems or cart machines as the number of channels, and recorded materials such as commercials are directly reproduced at random by the multicassette systems or cart machines in the order in which they are to be transmitted for broadcast in the channels.

Each of the systems called multicassette systems or cart machines comprises a recorder/reproducer for recording video and audio signals supplied from an external source and reproducing recorded video and audio signals, a shelf, a plurality of video tape cassettes stored on the shelf, a controller for retrieving a desired video tape cassette from the shelf based on an external control signal representing transmission information, for example, and controlling the recorder/reproducer to record and reproduce video and audio signals according to an external control signal, and a mechanism controllable by the controller for removing desired video tape cassette from the shelf and loading the removed video tape cassette inot the recorder/reproducer.

Generally, a list of broadcasts to be transmitted is generated using a work station, a personal computer, or the like, and the desired materials are reproduced in the order in which they are to be transmitted for broadcast, by the cart machine or multicassette system according to the list of broadcasts.

The applicant has previously proposed a cart machine for dubbing a material which has been recorded on a video tape cassette to another video tape cassette when a recorder and a reproducer are not in use (see Japanese laid-open patent publication No. 3-278732).

The above methods have posed the following problems:

In the former method, the video and audio signals of various commercials are recorded on a single video tape cassette corresponding to a channel, and then reproduced by a VTR corresponding to the channel when the commercials are to be actually transmitted for broadcast. Such a complex process of recording the video and audio signals of various commercials are recorded on a single video tape cassette in the order in which they are to be transmitted for broadcast has to be carried out manually. Since the video and audio signals of various commercials are already recorded on the video tape cassette, they will be useless if the order in which they are to be transmitted for broadcast is changed immediately before they are broadcast.

The latter method is required to have a very expensive overall system because each of the channels has to be equipped with a cart machine. Furthermore, if the video and audio signals of one commerial are to be broadcast in a plurality of channels, then a lot of preparatory work will be necessary because the video and audio signals of the same commercial have to be recorded in the respective cart machines corresponding to the channels.

OBJECTS AND SUMMARY OF THE INVENTION

It is therefore an object of the present invention to provide a recording and reproducing system which is capable of automatically carrying out a preparatory process for the reproduction of the same material for being broadcast in a plurality of channels, which allows the order in which materials are to be transmitted for broadcast to be simply changed immediately before they are broadcast, and which is relatively inexpensive to manufacture.

According to the present invention, there is provided a recording and reproducing system comprising control means for supplying control data based on broadcast schedule data, output means for outputting video and audio information based on the control data outputted from the control means, and a plurality of recording/reproducing means for recording the video and audio information outputted from the output means based on the control data outputted from the control means and reproducing recorded video and audio information based on the control data outputted from the control means. The control means may comprise first control means responsive to the broadcast schedule data for supplying control data and order data indicative of the order in which video and audio information is to be recorded and reproduced to the output means and the recording/reproducing means, and second control means responsive to the control data and order data supplied from the first control means and broadcast control data supplied from an external source, for supplying the recording/reproducing means with transmission control data to transmit reproduced video and audio information from the recording/reproducing means. The output means may comprise a multicassette system for recording video and audio information on and reproducing video and audio information from selected ones of a plurality of video tape cassettes based on the control data supplied from the control means. The recording/reproducing means may correspond to a plurality of transmission channels, respectively, and may comprise respective means for recording the video and audio information outputted from the output means based on the control data outputted from the control means and reproducing recorded video and audio information for transmission through the transmission channels, respectively, based on the control data outputted from the control means.

According to the present invention, there is also provided an apparatus for recording and reproducing a video signal, comprising storage means for storing video information, a plurality of temporal memory units for memorizing video information supplied from the storage means, and control means responsive to broadcast schedule data for controlling the storage means to reproduce the video information corresponding to the broadcast schedule data, controlling at least one of the temporal memory units to record the reproduced video information from the storage means, and for controlling the at least one of the temporal memory units to reproduce the recorded video information. The control means may comprise a first controller and a second controller, the first controller comprising means for controlling the storage means to reproduce the stored video information in a sequence based on the broadcast schedule data and controlling the temporal memory units to record the reproduced video information, the seocnd controller comprising means for controlling the at least one of the temporal memory units to reproduce the recorded video information in a sequence based on the broadcast schedule data. The storage means may comprise a plurality of video cassette recorder/reproducers, a plurality of tape cassettes, and a transfer mechanism for transferring one of the tape cassettes to one of the video cassette recorder/reproducers. Each of the temporal memory units may include an output channel for transmitting the reproduced video information for broadcast therethrough.

According to the present invention, there is further provided an apparatus for recording and reproducing a video signal for broadcast, comprising means for supplying broadcast schedule data, storage means for storing video information, the storage means comprising a plurality of video tape cassettes and a plurality of video tape cassette recorder/reproducers for reproducing video information recorded in the video tape casettes, a plurality of temporal memory units for recording and reproducing video information, each of the temporal memory units including an output channel for transmitting the reproduced video information for broadcast therethrough, and control means responsive to the broadcast schedule data for controlling the storage means to reproduce the stored video information, controlling the temporal memory means to record the video information reproduced from the storage means, and controlling the temporal memory means to reproduce the recorded video information and transmitting the reproduced video information for broadcast through the output channels. Each of the temporal memory units may comprise a random-access memory device, a magnetooptical memory device, or a semiconductor memory device.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

Figure 1:
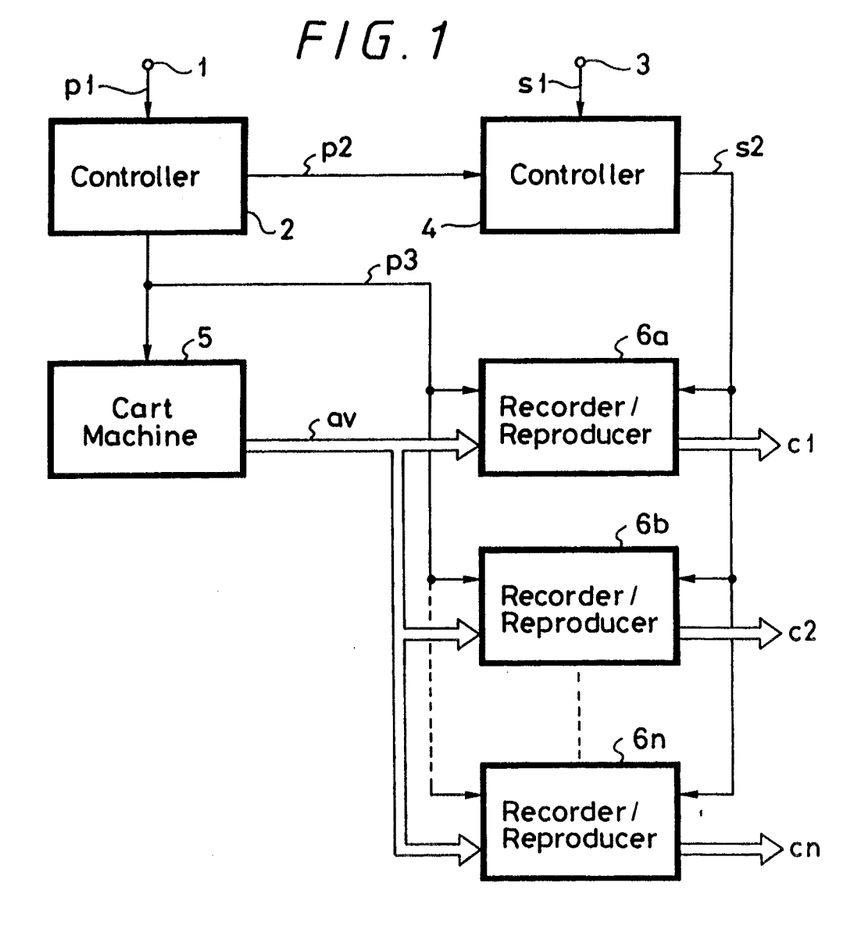
FIG. 1 is a block diagram of a recording and reproducing system according to an embodiment of the present invention.

As shown in FIG. 1, a recording and reproducing system according to the present invention includes a controller 2 in the form of a work station or a personal computer, for example, and having a display monitor, a computer itself, and a keyboard (not shown). The controller 2 serves to control recorder/reproducers 6a, 6b, ..., 6n, which may primarily comprise magnetooptical discs, and video tape cassettes and a data base of materials in a cart machine 5 based on broadcast schedule list data p1 representative of a list of programs scheduled to be broadcast. The controller 2 also supplies a data base p2 including the broadcast schedule list data p1 to a controller 4, and supplies control data and order list data p3 representative of a list of recorded materials in the order in which they are recorded to the cart machine 5 and the recorder/reproducers 6a, 6b, ..., 6n.

The broadcast schedule list data p1 are prepared for each of available transmission channels, and generated by a program schedule generating apparatus referred to as a traffic system, for example. One list of programs to be broadcast is shown by way of example in FIG. 4. The list of programs to be broadcast, indicated by the reference numeral 11 in FIG. 4, is displayed on a monitor screen 10, for example, of the controller 2.

Figure 4:
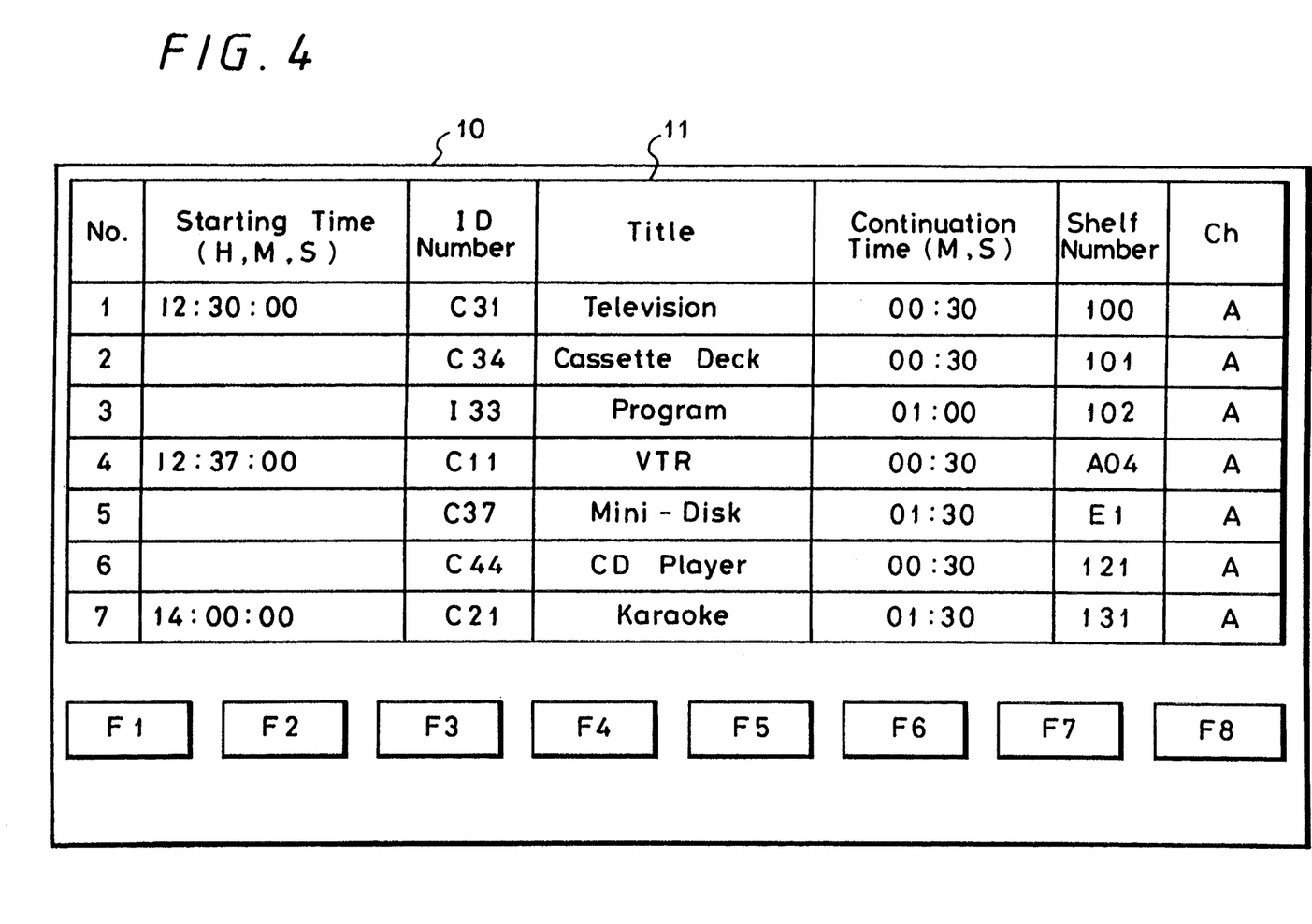
FIG. 4 is a diagram showing, by way of example, of a list of programs to be broadcast which is employed in the the recording and reproducing system shown in FIG. 1.

As shown in FIG. 4, the list 11 is composed of a column titled "NUMBER", a column titled "STARTING TIME (HOUR, MINUTE, SECOND)" indicating broadcast starting times, a column titled "IDENTIFICATION NUMBER" indicating identification numbers for identifying materials, a column titled "TITLE" indicating the titles of materials, a column tilted "CONTINUATION TIME (MINUTE, SECOND)" indicating the periods of time during which the materials are broadcast, a column titled "SHELF NUMBER" indicating shelf numbers (not shown) of the cart machine 5, and a column titled "ch" indicating transmission channels.

The monitor screen 10 displays, below the list 11, function keys "F1", "F2", ..., "F8". When any one of corresponding function keys "F1", "F2", ..., "F8", on the keyboard (not shown) is pressed, it outputs a control signal corresponding to one of functions displayed on the monitor screen 10, e.g., a temporary stop "PAUSE", a playback mode "PLAY", etc. The control signal is supplied to the cart machine 5 or the recorder/reproducers 6a, 6b, ..., 6n for operating cart machine 5 or the recorder/reproducers 6a, 6b, ..., 6n from the controller 2.

The controller 4, similar to the controller 2, is in the form of a work station or a personal computer, for example, the controller 4 having a display monitor, a computer itself, and a keyboard (not shown). The controller 4 serves to supply transmission control data s2 to the recorder/reproducers 6a, 6b, ..., 6n based on broadcast control data s1 supplied from an input terminal 3 and the data p2 supplied from the controller 2.

The broadcast control data s1 include transmission order data, i.e., data indicative of the order in which materials are to be transmitted for broadcast, starting times, and starting signals. Based on the broadcast control data s1, the controller 4 controls the recorder/reproducers 6a, 6b, . . . , 6n to control the transmission of materials in the channels. The broadcast control data s1 are outputted by an apparatus referred to as an automation system which enables the trasnmission of a program when a certain time arrives.

The recorder/reproducers 6a, 6b, . . . , 6n that are controlled by the controllers 2, 4 may comprise VTRs, but more preferably may comprise magnetooptical disc devices, optical disc devices, or recorder/reproducers employing RAMs as mediums, which are accessible more rapidly and controllable more simply than VTRs.

The recorder/reproducers 6a, 6b, . . . , 6n correspond to respective transmission channels c1, c2, . . . , cn, and reproduce desired materials from the mediums based on the transmission control data s2 from the controller 4 and transmit the reproduced materials for broadcast in the respective transmission channels c1, c2, . . . , cn.

Based on the control data (including shelf number data) and the order list data p3 which are supplied from the controller 2, the cart machine (or multicassette system) 5 automatically removes a video tape cassette which contains a desired recorded material from the shelf, loads the removed video tape cassette into a reproducer or a recorder/reproducer (not shown), and reproduces the material from the video tape cassette or records the video and audio signals of a material supplied from an external source on the video tape cassette.

Video and audio signals av of the material reproduced by the cart machine 5 are supplied to the recorder/reproducers 6a, 6b, . . . , 6n. Any one of the recorder/reproducers 6a, 6b, . . . , 6n records the supplied video and audio signals av if data indicative of recording among the control data and the order list data p3 which are supplied from the controller 2 represents that one of the recorder/reproducers.

The sequence of operations by the above various devices is summarized as follows: When the broadcast schedule list data p1 as shown in FIG. 4 are supplied to the controller 2, the controller 2 compares the broadcast schedule list data p1 with the data bases for the recorder/reproducers 6a, 6b, . . . , 6n to determine which ones of the recorder/reproducers 6a, 6b, . . . , 6n have not recorded which material.

Thereafter, the control data (including the shelf number data) and the order list data p3 are supplied to the cart machine 5 and the recorder/reproducers 6a, 6b, . . . , 6n to enable the cart machine 5 to reproduce the video and audio signals of a desired material and also to enable desired ones of the recorder/reproducers 6a, 6b, . . . , 6n to record the reproduced material.

Based on the broadcast control data s1, the controller 4 places the recorder/reproducers 6a, 6b, . . . , 6n in a playback mode to transmit the video and audio signals of commercial materials in multiple channels at corresponding broadcasting times.

The period of time in which commercials are reproduced for ordinary broadcasts is about 20 percent of the time of one program. As the rest of the time is consumed by a program material itself, a live broadcast, or the like, the above recording and reproducing system is not used in that period of time.

Materials for use as commercials are often used in common between the channels. According to the present invention, while a program material or a live broadcast is being transmitted, i.e., while the recording and reproducing system is not in use for broadcasting materials, the controller 2 detects, from the recorded conditions of the recorder/reproducers 6a, 6b, . . . , 6n, those of the recorder/reproducers 6a, 6b, . . . , 6n which have not recorded materials as commercials that are scheduled to be transmitted in the channels c1, c2, . . . , cn corresponding to the recorder/reproducers 6a, 6b, . . . , 6n, and then records the video and audio signals of those desired materials in the detected ones of the recorder/reproducers 6a, 6b, . . . , 6n.

The controller 2 then controls the cart machine 5 to reproduce the video and audio signals of the desired materials, and also controls those of the recorder/reproducers 6a, 6b, . . . , 6n which have not recorded the materials scheduled to be transmitted to record the video and audio signals of the same materials. Therefore, the same materials as commercials can be transmitted in multiple channels for broadcast.

If the recorder/reproducers 6a, 6b, . . . , 6n are magnetooptical disc devices or the like that are randomly accessible, then required materials are recorded in the recorder/reproducers 6a, 6b, . . . , 6n within predetermined times subsequent to the present time. This is made possible by using and not using the medium in units of blocks.

More specifically, if the recorder/reproducers 6a, 6b, . . . , 6n are randomly reproducible, then when broadcasting times arrive, the controller 4 controls the recorder/reproducers 6a, 6b, . . . , 6n to perform the random reproduction function to successively reproduce different materials.

In commercial broadcasts, one commercial material is often reproduced repeatedly in a short period of time, and hence it is not necessary to record all materials in the order in which they will be broadcast with time. The controller 2 compares the broadcast schedule list data p1 with the data bases of the recorder/reproducers 6a, 6b, . . . , 6n, and may control them to record only those materials which are missing.

If the recorder/reproducers 6a, 6b, . . . , 6n use RAMs or magnetooptical discs as their mediums, they can simultaneously record and reproduce materials. Therefore, while materials are being reproduced for broadcast from the recorder/reproducers 6a, 6b, . . . , 6n, video and audio signals from the cart machine 5 can continuously be recorded by the recorder/reproducers 6a, 6b, . . . , 6n.

If the recorder/reproducers 6a, 6b, . . . , 6n comprise VTRs, then since they cannot reproduce recorded materials at random, it is the only way for them to record materials in the order in which the materials are to be transmitted for broadcast. Therefore, the recorded conditions of the the recorder/reproducers 6a, 6b, . . . , 6n corresponding to the respective channels are detected, and materials reproduced by the cart machine 5 are recorded in advance in those of the recorder/reproducers 6a, 6b, . . . , 6n which have not recorded the materials to be transmitted, so that the materials can be recorded in the order in which the materials are to be transmitted for broadcast.

Figure 2:
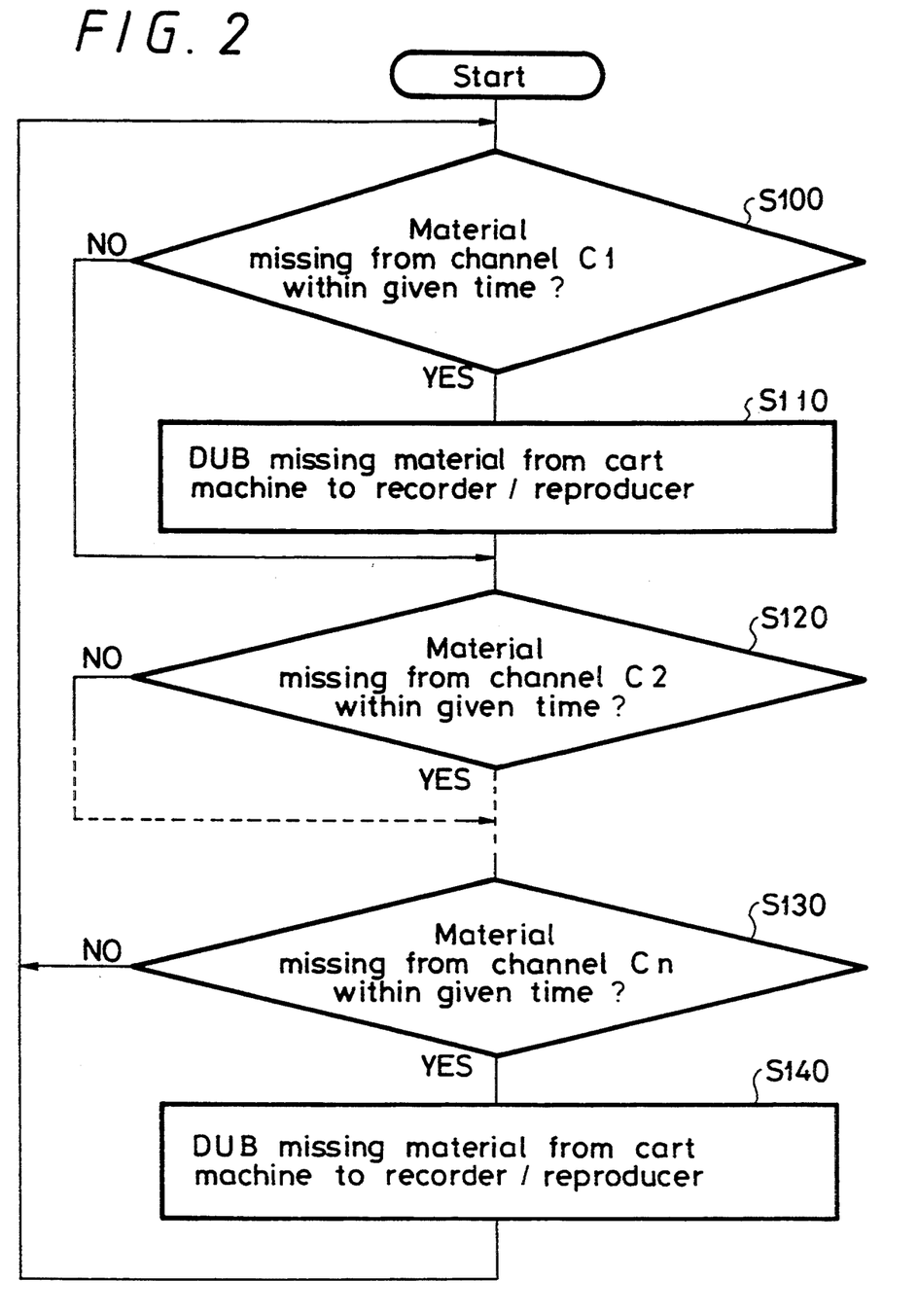
FIG. 2 is a flowchart of an operation sequence of a controller of the recording and reproducing system shown in FIG. 1.

An operation sequence of the controller 2 shown in FIG. 1 will be described below with reference to the flowchart of FIG. 2.

In a step S100, the controller 2 determines whether there is a material missing from the transmission channel c1 within a predetermined period of time or not. If "YES", then control goes to a step S110, and if "NO", then control jumps to a step S120.

Specifically, in the step S100, the controller 2 compares the broadcast schedule list data p1 supplied through the input terminal 1 for the transmission channel c1 with the data base recorded on the medium loaded in the recorder/reproducer 6a to check if there is a material missing from the transmission channel c1 within a predetermined period of time or not.

In the step S110, the controller 2 controls the reproduction from the cart machine 5 and the recording in the recorder/reproducer 6a to dub any missing material from the cart machine 5 to the recorder/reproducer 6a. Then, control goes to the step S110.

Specifically, in the step S110, the controller 2 supplies the control data and the order list data P3 to the cart machine 5 and the recorder/reproducer 6a, controls the cart machine 5 to reproduce the video and audio signals of the missing material, and also controls the recorder/reproducer 6a to record the reproduced video and audio signals on its medium.

In the step S120, the controller 2 determines whether there is a material missing from the transmission channel c2. Similarly, the controller 2 detects and dubs any missing materials successively for the transmission channels.

In a step S130, the controller 2 determines whether there is a material missing from the transmission channel cn within a predetermined period of time or not. If "YES", then control goes to a step S140, and if "NO", then control goes back to the step S100.

Specifically, in the step S130, the controller 2 compares the broadcast schedule list data p1 supplied through the input terminal 1 for the channel cn with the data base recorded on the medium loaded in the recorder/reproducer 6n to check if there is a material missing from the transmission channel cn within a predetermined period of time or not.

In the step S140, the controller 2 controls the reproduction from the cart machine 5 and the recording in the recorder/reproducer 6n to dub any missing material from the cart machine 5 to the recorder/reproducer 6n. Then, control returns to the step S100.

Specifically, in the step S140, the controller 2 supplies the control data and the order list data P3 to the cart machine 5 and the recorder/reproducer 6n, controls the cart machine 5 to reproduce the video and audio signals of the missing material, and also controls the recorder/reproducer 6n to record the reproduced video and audio signals on its medium.

If the recorder/reproducers 6a, 6b, ..., 6n comprise recorder/reproducers that are capable of simultaneously recording and reproducing materials, then it may be possible to consider that a block composed of the controller 2, the cart machine 5, and the recording devices of the recorder/reproducers 6a, 6b, ..., 6n and a block composed of the controller 4 and the reproducing devices of the recorder/reproducers 6a, 6b, ..., 6n function independently of each other.

Figure 3:
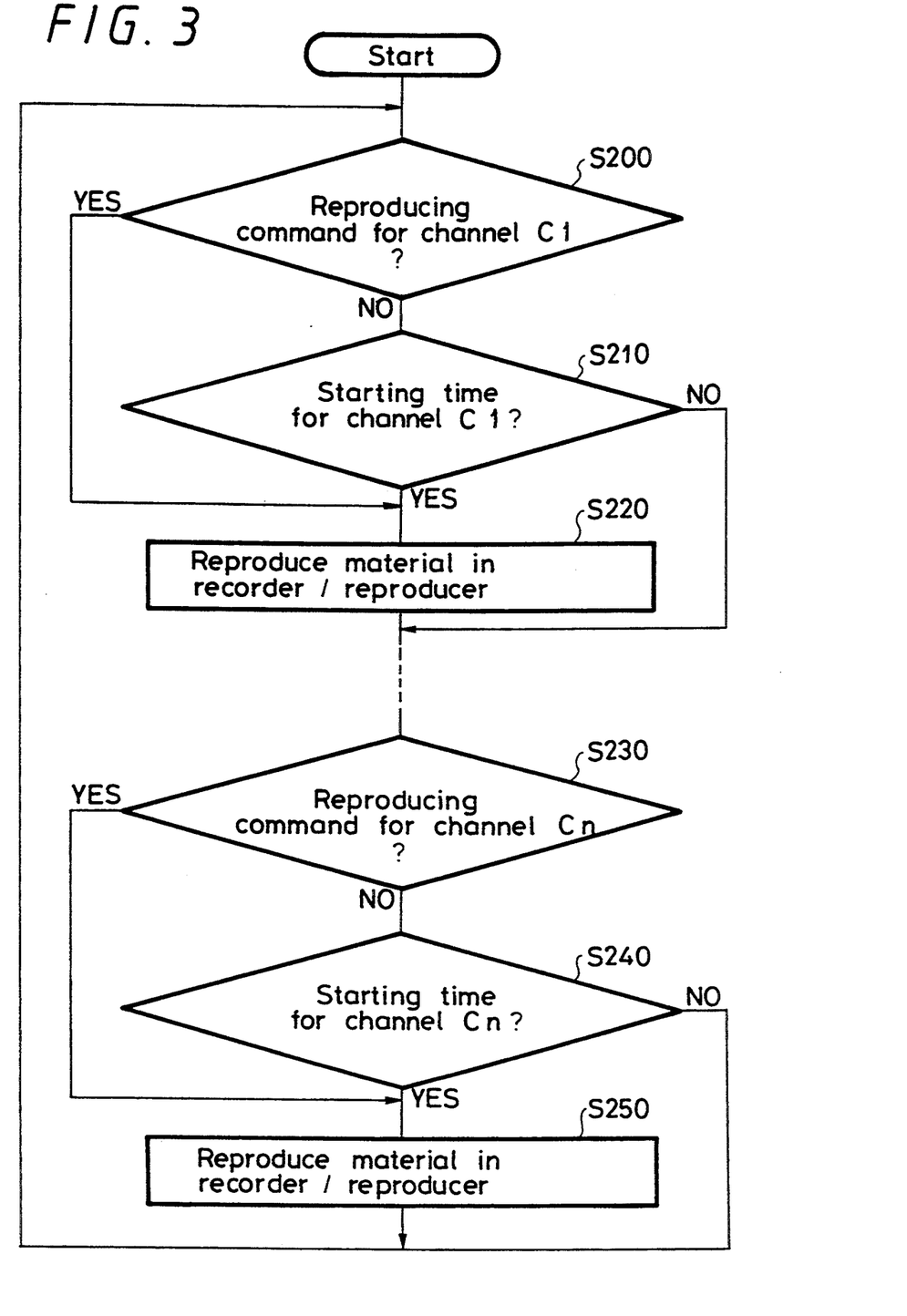
FIG. 3 is a flowchart of an operation sequence of another controller of the recording and reproducing system shown in FIG. 1.

An operation sequence of the controller 4 shown in FIG. 1 will be described below with reference to the flowchart of FIG. 3.

In a step S200, the controller 4 determines whether a reproducing command for the transmission channel c1 has arrived. If "YES", then control jumps to a step S220, and if "NO" then control goes to a step S210.

Specifically, in the step S200, the controller 4 determines whether the broadcast control data s1 supplied through the input terminal 3 have indicated the reproduction of a material for the channel c1.

In the step S210, the controller 4 determines whether a starting time for the transmitting channel c1 has been reached or not. If "YES", then control goes to the step S220, and if "NO", then control jumps to a step next to the step S220. Similarly, the above steps are carried out for the other transmission channels up to the transmission channel cn.

Specifically, in the step S210, the controller 4 determines whether a starting time for the list for the transmission channel c1 has been reached or not based on the broadcast control data s1 and the data base p2 including the broadcast schedule list data p1 supplied from the controller 2.

In the step S220, the controller 4 controls the recorder/reproducer 6a to reproduce material by supplying the transmission control data s2. The reproduced material is now transmitted through the transmission channel c1. The similar step is carried out for the other transmission channels up to the transmission channel cn.

In a step S230, the controller 4 determines whether a reproducing command for the transmission channel cn has come or not. If "YES", then control jumps to a step S250, and if "NO", then control goes to a step S240.

Specifically, in the step S230, the controller 4 determines whether the broadcast control data s1 supplied through the input terminal 3 have indicated the reproduction of a material for the channel cn.

In the step S240, the controller 4 determines whether a starting time for the transmitting channel c1 has been reached or not. If "YES", then control goes to the step S250, and if "NO", then control goes back to the step S200.

Specifically, in the step S240, the controller 4 determines whether a starting time for the list for the transmission channel c1 has been reached or not based on the broadcast control data s1 and the data base p2 including the broadcast schedule list data p1 supplied from the controller 2.

In the step S250, the controller 4 controls the recorder/reproducer 6n to reproduce a material by supplying the transmission control data s2. The reproduced material is now transmitted through the transmission channel cn.

The controller 4 refers to the program list data for each channel supplied from the controller 2, a host system, or the non-illustrated keyboard, and either reproduces recorded materials in a random playback control mode as with the card machine 5 if the materials are recorded at random, or effects timing control for accessing and reproducing recorded materials if the materials are recorded on mediums in the order in which they are to be transmitted for broadcast.

For controlling the transmission of reproduced materials for broadcast, the controller 4 needs information recorded on the mediums in the recorder/reproducers 6a, 6b, ..., 6n. To obtain such information, the controller 4 may be supplied with the data base p2 of the recorder/reproducers 6a, 6b, ..., 6n, or may be supplied with necessary information from a host machine which is supplied from the data base p2 of the recorder/reproducers 6a, 6b, ..., 6n from the controller 2.

The latter process is carried out in a present single-channel system in which materials are recorded on the mediums of recorder/reproducers 6a, 6b, ..., 6n.

As described above, when the broadcast schedule list data p1 are supplied to the controller 2, the controller 2 compares the broadcast schedule list data p1 with the data bases p2 of the recorder/reproducers 6a, 6b, ..., 6n to detect which recorder/reproducers 6a, 6b, ..., 6n have not recorded which material. Thereafter, the controller 2 supplies the control data including the shelf number data and the order list data p3 to the cart machine 5 and the recorder/reproducers 6a, 6b, . . . , 6n to enable the cart machine 5 to reproduce the video and audio signals of a desired material and also to enable desired ones of the recorder/reproducers 6a, 6b, . . . , 6n to record the reproduced video and audio signals of the desired material. In response to the transmission control data s2 obtained based on the broadcast control data s1, the controller 4 places the recorder/reproducers 6a, 6b, . . . , 6n in the playback mode to transmit the video and audio signals of commercial materials in multiple channels at corresponding broadcasting times. Consequently, the recording and reproducing system can automatically carry out a preparatory process to reproduce the same material in a plurality of transmission channels, can easily change the order in which materials are scheduled to be transmitted immediately before they are broadcast, and is relatively inexpensive to manufacture. The recording and reproducing system operates highly efficiently because any missing materials can be recorded while a program material or a live broadcast is being transmitted.

While the recorder/reproducers 6a, 6b, . . . , 6n have been described as comprising VTRs, magnetooptical disc devices, or the like, they may comprise multimedium loading devices that have recording and reproducing functions and can be controlled on-line from an external source, such as cart machines, for example.

The cart machine 5 may be replaced with a large-capacity data storage device insofar as it can record, store, and reproduce the video and audio signals of a large number of materials.

The recording and reproducing system has been described with respect to recording and reproducing the video and audio signals of materials such as commercials for broadcast. However, the recording and reproducing system may be used as a multichannlel information distribution system which can distribute not only video and audio signals but also various data with a large-capacity data storage device such as a data recorder or the like and a plurality of recorder/reproducers.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A recording and reproducing system for recording and reproducing audio and video signals in accordance with a broadcast schedule which determines a schedule for broadcasting segments of audio and video information, comprising:
supply means for supplying segments of video and audio information;
a plurality of recording/reproducing means for recording video and audio information supplied by said supply means; and
control means responsive to broadcast schedule data for determining from said broadcast schedule data whether respective segments of said audio and video information that are scheduled to be broadcast are recorded in respective ones of said plural recording/reproducing means, controlling said supply means to supply respective segments of said audio and video information that are not stored in said respective recording/reproducing means, and controlling said respective recording/reproducing means to record the reproduced respective segments of said audio and video information supplied by said supply means.

2. A recording and reproducing system according to claim 1, wherein said control means comprises:
first controller means responsive to said broadcast schedule data, for supplying control and order data indicative of an order in which the respective segments of said video and audio information are to be supplied by said supply means and recorded by said recording/reproducing means, said control and order data being supplied to said supply means and to said recording/reproducing means; and
second controller means responsive to said broadcast schedule data supplied via said first controller means and responsive to externally supplied broadcast control data, for supplying said plural recording/reproducing means with transmission control data to reproduce and transmit video and audio information from the plural recording/reproducing means as a function of said broadcast schedule data and said broadcast control data.

3. A recording and reproducing system according to claim 1, wherein said control means supplies said supply means with control and order data indicative of an order in which the respective segments of said video and audio information are to be supplied by said supply means, and said supply means includes a multi-cassette system for recording video and audio information on and for reproducing video and audio information from selected ones of a plurality of video tape cassettes as a function of said control and order data supplied by said control means.

4. A recording and reproducing system according to claim 1, wherein said control means supplies said recording/reproducing means with control data derived from said broadcast control data, and respective ones of said recording/reproducing means correspond to respective ones of a plurality of transmission channels such that video and audio information is reproduced from said respective recording/reproducing means and transmitted through said corresponding respective transmission channels as a function of said control data outputted from said control means.

5. An apparatus for recording and reproducing video signals in accordance with a broadcast schedule which determines a schedule for broadcasting segments of audio and video information, comprising:
first storage means for storing video information;
a plurality of second storage means for storing video information supplied by said first storage means;
a plurality of output channels for transmitting reproduced video information for broadcast; and
control means responsive to broadcast schedule data and responsive to broadcast control data for determining from said broadcast schedule data whether respective segments of said video information that are scheduled to be broadcast are stored in respective ones of said second storage means, controlling said first storage means to reproduce therefrom the respective segments of said video information corresponding to said broadcast schedule data that are not stored in said respective second storage means, controlling said respective second storage means to record the video information reproduced from said first storage means, controlling said respective second storage means to reproduce the recorded video information as a function of said broadcast schedule data and said broadcast control data, and controlling said plural output channels to transmit the video information reproduced from said respective second storage means for broadcast.

6. An apparatus according to claim 5, wherein said control means comprises a first controller means and a second controller means, said first controller means for controlling said first storage means to reproduce segments of the stored video information in a sequence as a function of said broadcast schedule data and for controlling said respective second storage means to record the segments of video information reproduced from said first storage means, said second controller means for controlling said respective second storage means to reproduce therefrom the recorded video information as a function of said broadcast schedule data and said broadcast control data.

7. An apparatus according to claim 6, wherein said first storage means comprises a plurality of video cassette recorded/reproducers, a plurality of tape cassettes, and a transfer mechanism for transferring one of said tape cassettes to one of said video cassette recorded/reproducers.

8. An apparatus for recording and reproducing video signals in accordance with a broadcast schedule which determines a schedule for broadcast of segments of video information, comprising:

input means for inputting broadcast schedule data;

first storage means for storing video information, said storage means comprising a plurality of video tape cassettes and a plurality of video tape cassette recorder/reproducers for reproducing video information recorded in said video tape cassettes;

a plurality of second storage means for recording and reproducing video information, each of said second storage means including a respective output channel for transmitting the video information reproduced from a respective second storage means for broadcast therethrough; and control means responsive to said broadcast schedule data for determining from said broadcast schedule data whether respective segments of said video information that are scheduled to be broadcast are stored in respective ones of said second storage means, controlling said first storage means to reproduce the respective segments of said stored video information that are not stored in said respective second storage means, controlling said respective second storage means to record the video information reproduced from said first storage means, and controlling said respective second storage means means to reproduce the video information recorded thereby and transmit the reproduced video information through said respective output channels for broadcast.

9. An apparatus according to claim 8, wherein each of said second storage means comprises a random-access memory device.

10. An apparatus according to claim 8, wherein each of said second storage means comprises a magneto-optical memory device.

11. An apparatus according to claim 8, wherein each of said second storage means comprises a semiconductor memory device.

* * * * *